United States Patent [19]

Sypula et al.

[11] Patent Number: 4,747,992

[45] Date of Patent: May 31, 1988

[54] PROCESS FOR FABRICATING A BELT

[76] Inventors: Donald S. Sypula, 15 Burnley Rise, Pittsford, N.Y. 14534; Merlin E. Scharfe, 273 Valley Green Dr., Penfield, N.Y. 14526; Dennis A. Abramsohn, 23 Crestview Dr., Pittsford, N.Y. 14534; Paul J. Brach, 203 Nichols St., Rochester, N.Y. 14609; Clifford H. Griffiths, 230 Tobey Rd., Pittsford, N.Y. 14534; Deborah J. Nichol-Landry, 83 W. Parkway, Rochester, N.Y. 14616; Andrew R. Melnyk, 140 Windemere Rd., Rochester, N.Y. 14610; John W. Spiewak, 773 Saffron La., Webster, N.Y. 14580; Joseph Mammino, 59 Bella Dr., Penfield, N.Y. 14526; Edward C. Williams, 126 Canandagua Rd., Palmyra, N.Y. 14522; Lieng-Huang Lee, 796 John Glenn Blvd., Webster, N.Y. 14580; Christine J. Tarnawskyj, 75 Ridgeport Cir., Rochester, N.Y. 14617

[21] Appl. No.: 842,953

[22] Filed: Mar. 24, 1986

[51] Int. Cl.$^4$ ............... B29C 33/58; B29C 41/04; B29C 41/08; B29C 41/42

[52] U.S. Cl. .................... 264/130; 249/183; 264/131; 264/234; 264/237; 264/255; 264/300; 264/302; 264/304; 264/305; 264/310; 264/331.17; 264/334; 264/335; 264/337; 264/345; 264/348; 264/DIG. 72; 425/438

[58] Field of Search ............ 264/130, 131, 135, 221, 264/255, 300, 301, 302, 304, 305, 310, 313, 334, 335, 337, 331.17, 2.3, 237, 238, 234, 272.13, 348, 345, DIG. 72; 425/438; 249/183

[56] References Cited

U.S. PATENT DOCUMENTS

| | | |
|---|---|---|
| 1,036,416 | 8/1912 | Aylsworth . |
| 1,535,368 | 4/1925 | MacAleese . |
| 1,573,386 | 2/1926 | Field . |
| 1,752,371 | 4/1930 | Daniels ........................ 264/304 X |
| 2,045,123 | 6/1936 | Chambers . |
| 2,272,704 | 5/1940 | Harding . |
| 2,361,026 | 10/1944 | Greene . |
| 2,384,055 | 9/1945 | Tritt . |
| 2,604,658 | 7/1952 | Broden . |
| 2,888,712 | 9/1953 | Kramer et al. . |
| 3,290,728 | 12/1966 | Pratt . |
| 3,564,661 | 2/1971 | Atwell ........................ 249/183 X |
| 3,576,928 | 4/1971 | Barker et al. ........................ 264/24 |
| 3,607,998 | 9/1971 | Goodridge ........................ 264/24 |
| 3,617,588 | 11/1971 | Langman ........................ 264/301 X |
| 3,634,572 | 1/1972 | Richmond et al. ................ 264/159 |
| 3,676,210 | 7/1972 | Shattuck et al. . |
| 3,698,847 | 10/1972 | Goodridge . |
| 3,844,906 | 10/1974 | Bailey et al. ........................ 204/9 |
| 3,849,128 | 11/1974 | Ihara . |
| 3,876,510 | 4/1975 | Wallin et al. ........................ 204/9 |
| 3,905,400 | 7/1975 | DuPree et al. ........................ 138/140 |
| 3,927,463 | 12/1975 | DuPree et al. ........................ 29/447 |
| 3,947,348 | 3/1976 | Schabernack et al. ................ 204/9 |
| 3,950,839 | 4/1976 | DuPree et al. ........................ 29/447 |
| 3,963,587 | 6/1976 | Kreckel ........................ 204/9 |
| 3,994,726 | 11/1976 | Wales . |
| 4,002,476 | 1/1977 | Wales . |
| 4,061,599 | 12/1977 | Marlor ........................ 252/501 |
| 4,067,782 | 1/1978 | Bailey et al. ........................ 204/25 |
| 4,095,480 | 6/1978 | Schwabauer ........................ 264/313 X |
| 4,111,861 | 9/1978 | Godlewski ........................ 521/123 |
| 4,143,024 | 3/1979 | Adelmann et al. . |
| 4,169,903 | 10/1979 | Scholes ........................ 427/28 |
| 4,210,710 | 7/1980 | Bixby ........................ 430/56 |
| 4,252,883 | 2/1981 | Komura et al. ........................ 430/132 |
| 4,258,113 | 3/1981 | Kuehnle ........................ 430/94 |
| 4,265,990 | 5/1981 | Stolka et al. ........................ 430/59 |
| 4,326,928 | 4/1982 | Dugan ........................ 204/9 |
| 4,337,220 | 6/1982 | Arimatsu ........................ 264/25 |
| 4,383,020 | 5/1983 | Roberts et al. ........................ 430/127 |
| 4,394,340 | 7/1983 | Tarumi et al. ........................ 264/310 X |
| 4,418,132 | 11/1983 | Yamazaki ........................ 430/57 |
| 4,426,435 | 1/1984 | Oka ........................ 430/66 X |
| 4,435,351 | 3/1984 | Gilmore ........................ 264/335 |
| 4,438,065 | 3/1984 | Brown ........................ 264/335 |
| 4,472,341 | 9/1984 | Alberino et al. ........................ 264/300 |
| 4,481,273 | 11/1984 | Katagiri et al. ........................ 430/59 |
| 4,501,646 | 2/1985 | Herbert ........................ 204/4 |
| 4,548,779 | 10/1985 | Steinberg et al. ........................ 264/310 X |

FOREIGN PATENT DOCUMENTS

| | | | |
|---|---|---|---|
| 771176 | 8/1970 | Belgium ........................ 264/24 |
| 1018932 | 10/1977 | Canada ........................ 204/72 |
| 54-128740 | 5/1979 | Japan ........................ 430/134 |
| 57-201640 | 12/1982 | Japan . |
| 951881 | 3/1964 | United Kingdom ................ 264/305 |
| 1288717 | 4/1971 | United Kingdom . |

*Primary Examiner*—Jeffery Thurlow
*Assistant Examiner*—Leo B. Tentoni
*Attorney, Agent, or Firm*—Peter H. Kondo

[57] ABSTRACT

A process is disclosed for forming at least one thin substantially uniform fluid coating comprising polymeric film forming material on a cylindrical mandrel, solidifying the fluid coating to form a uniform solid coating and separating the uniform solid coating from the mandrel. The process may comprise forming at least one thin substantially uniform fluid coating comprising polymeric film forming material around a cylindrical mandrel, the mandrel having a larger mass or lower thermal conductivity than the polymeric film forming material and a critical surface tension greater than the surface tension of the fluid coating, solidifying the fluid coating to form at least one thin substantially uniform solid coating comprising the polymeric film forming material around the cylindrical mandrel, heating both the uniform solid coating and the mandrel to a temperature at least above the apparent $T_g$ of the solid coating to expand the coating and the mandrel while maintaining contact between the coating and the mandrel, cooling the coating to below the apparent $T_g$ of the solid coating prior to substantial cooling of the mandrel, and cooling the mandrel whereby the mandrel contracts at a greater rate than the polymeric coating until separation occurs between the mandrel and the coating, and removing the coating from the mandrel.

17 Claims, No Drawings

PROCESS FOR FABRICATING A BELT

This invention relates to a process for preparing belts and more particularly, to a method of forming a belt on a mandrel and thereafter removing it from the mandrel.

Generally, belt fabrication systems require considerable space for equipment and processing. For coated belts, elaborate handling procedures and machinery is needed to manipulate the belts between coatings if the coatings are applied after the belt is formed. Such handling between coatings increases the likelihood of damage due to scratches, creases, folds, fingerprints, dust contamination and the like which reduce overall yield and increase cost.

Most belts normally have a thickness greater than about 10 mils and are usually formed by molding or lamination. Molding is carried out in molds which results in flashings that require removal to achieve a smooth outer surface. Lamination is also employed to form belts. Lamination may be accomplished by applying alternate layers of thermoplastic sheets and reinforcing fabrics. These materials are relatively thick and stiff, and not suitable for extended cycling over small diameter pulleys or rolls. Other types of belts have been prepared by welding opposite ends of sheets together to form belts having a seam.

Originally, photoreceptors for electrophotographic imaging systems comprised selenium alloys vacuum deposited on rigid aluminum substrates. These photoreceptors required elaborate, highly sophisticated, and expensive equipment for fabrication. Photoreceptors have also been prepared by coating rigid substrates with photoconductive particles dispersed in an organic film forming binder. Coating of rigid drum substrates have been effected by various techniques such as spraying, dip coating, vacuum evaporation, and the like. Rigid drum photoreceptors limit apparatus design flexibility and flash exposure and are expensive. Flexible organic photoreceptors in the form of belts have recently become popular. These flexible photoreceptors are manufactured by coating a web and thereafter shearing the web into segments which are thereafter formed into belts by welding opposite ends of the sheared web. The resulting welded seam on the photoreceptor disrupts the continuity of the outer surface of the photoreceptor and must be indexed so that it does not print out during an imaging cycle. In other words, efficient stream feeding of paper and throughput are adversely affected because of the necessity to detect a seam within the length of each sheet of paper. The mechanical and optical devices required for indexing add to the complexity, cost of copiers, duplicators and printers, and reduce the flexibility of design. Welded belts are also less desirable for electrophotographic imaging systems because the seam forms a weak point in the belt and collects toner debris during cleaning, particularly with wiper blade cleaning devices.

While some of the above described belts are still useful, there continues to be a need for improved, thin, flexible, seamless belts, particularly electrostatographic imaging members.

SUMMARY OF INVENTION

It is a feature of the present invention to provide a process for fabricating improved thin, flexible seamless belt which overcomes the above noted disadvantages.

It is a feature of the present invention to provide a process for fabricating improved thin, flexible belt which is free of seams.

It is a feature of the present invention to provide a process for fabricating improved thin, flexible belt which comprises a plurality of layers.

It is still another feature of this invention to provide a process for fabricating a thin, flexible seamless belt which readily forms a thin uniform fluid coating on a mandrel.

It is still another feature of this invention to provide a process for fabricating a thin, flexible, solid seamless belt which is readily removed from a mandrel.

It is still another feature of this invention to provide a process for fabricating a thin, flexible, solid seamless belt which resists curling and obviates the need for an anti-curl backing coating.

It is still another feature of this invention to provide a process for fabricating a thin, flexible seamless belt which easily bends around small diameter pulleys and rolls.

It is still another feature of this invention to provide a process for fabricating a thin, flexible seamless belt which eliminates the need for seam detection devices.

It is still another feature of this invention to provide a process for fabricating a thin, flexible seamless belt which can readily be modified to prepare belts of different widths, circumferences and thicknesses.

It is still another feature of this invention to provide a process for fabricating a thin, flexible seamless belt which allows greater throughput of documents in imaging systems for higher productivity.

It is still another feature of this invention to provide a process for fabricating a thin, flexible seamless belt which facilitates smaller imaging devices with throughput equivalent to larger imaging devices.

These and other features of the present invention are accomplished by forming at least one thin substantially uniform fluid coating comprising polymeric film forming material on a cylindrical mandrel, solidifying the fluid coating to form a uniform solid coating and separating the uniform solid coating from the mandrel. More preferably, the process of the present invention comprises forming at least one thin substantially uniform fluid coating comprising polymeric film forming material around a cylindrical mandrel, the mandrel having a larger mass or lower thermal conductivity than the polymeric film forming material and a critical surface tension greater than the surface tension of the fluid coating, solidifying the fluid coating to form at least one thin substantially uniform solid coating comprising the polymeric film forming material around the cylindrical mandrel, heating both the uniform solid coating and the mandrel to a temperature at least above the apparent $T_g$ of the solid coating to expand the coating and the mandrel while maintaining contact between the coating and the mandrel, cooling the coating to below the apparent $T_g$ of the solid coating prior to substantial cooling of the mandrel, and cooling the mandrel whereby the mandrel contracts at a greater rate than the polymeric coating until separation occurs between the mandrel and the coating, and removing the coating from the mandrel.

Any suitable film forming polymer may be applied to form the belt substrate coating on the mandrel. Typical forming polymers include polycarbonates (e.g. Makrolon 5705, available from Bayer Chemical Co., Merlon M39, available from Mobay Chemical Co., Lexan 145, available from General Electric Co.), polysulfones (e.g. P-3500, available from Union Carbide Corp.), polyesters (e.g. PE-100 and PE-200, available from Goodyear Tire and Rubber Co.), cellulosic resins, polyarylates, acrylics, styrene-butadiene copolymers, polyarylsulfones, polybutylenes, polyether sulfones, polyphenylenesulfides, polyurethanes, polyimides, epoxies, poly(amide-imide) (e.g. Al830, available from AMOCO Chemical Corp.), copolyesters (Kodar Copolyester PETG 6763 available from Eastman Kodak Co.) polyethersulfones, polyetherimide (e.g. available from General Electric Co.), polyether sulfone, polyvinylidine fluoride (e.g. available from Pennwalt Corp.), polyvinyl fluoride (e.g. available from E. I. du Pont de Nemours & Co), polyarylethers, and the like and mixtures thereof. Polycarbonate polymers may be made, for example, from 2,2-bis(4-hydroxyphenol)propane, 4,4'-dihydroxy-diphenyl-1,1-ethane, 4,4'-dihydroxy-diphenyl-1,1-isobutane, 4,4'-dihydroxy-diphenyl-4,4-heptane, 4,4'-dihydroxy-diphenyl-2,2-hexane, 4,4'-dihydroxy-triphenyl-2,2,2-ethane, 4,4'-dihydroxy-diphenyl-1,1-cyclohexane, 4,4'-dihydroxy-diphenyl-β-β-decahydronaphthalene, cyclopentane derivatives of 4,4'-dihydroxydiphenyl-β-β-decahydronaphthalene, 4,4'-dihydroxy-diphenyl-sulphone, and the like. Suitable film forming polymers may be dry, solvent soluble, or molten during application to the mandrel. They should be capable of forming a uniform fluid coating on the mandrel. The coating of film forming polymers may be formed from the application to the mandrel of the film forming polymer in a solution, dispersion, emulsion or powder. The final solid belt may be formed from the fluid coating on the mandrel by curing to polymerize the film forming polymer in situ, drying to remove a solvent from a solution of the film forming polymer or merely cooling molten film forming polymer below its glass transition temperature. Typical examples of curable film forming polymer materials include prepolymers of polyimide, poly(amide-imide) polyurethanes, epoxy, polyesters, acrylics, alkyds, and the like. Depending on the nature of the polymer and catalyst employed, curing may be effected at room temperature or with the application of heat, light and/or other radiation. Curable polymers may be in the form of prepolymers and include polymers such as polyimides, poly(amide-imide), polyurethanes, epoxy and the like.

Any suitable additive may be added to the coating composition. For example, the additive may be added to enhance wetting of the mandrel or to facilitate substrate removal. Typical release materials include, for example, mold release agents such as silicones, fluorocarbons, hydrocarbons, soaps, detergents, surfactants (e.g. Silwet L-7500, Silwet L-7602, GAFAC RA600), and the like. Generally, the amount of release material added is less than about 10 percent based on the total weight of the final solid coating.

Although the fluid coating may comprise the film forming polymer in a molten state, a liquid carrier is preferably employed to form a solution, dispersion or emulsion of the film forming polymer, the combination of both the liquid carrier and film forming polymer having a lower surface tension than the film forming polymer free of the liquid carrier. Thus, the surface tension of the applied coating is increased upon drying. In order to achieve a uniform fluid coating comprising the liquid carrier and film forming polymer on a mandrel, the fluid coating should have a surface tension lower than that of the mandrel surface being coated.

The surface tension of the mandrel surface should be low and preferably below about 31 dyne/cm to facilitate removal of the resulting belt from the mandrel. The expressions "substantially free of the liquid carrier" and "substantially dry" are intended to mean that the solidified, dry film forming polymer coating contains less than about 5 percent by weight of the liquid carrier based on the total weight of the solidified, dry film forming polymer coating. It is preferred to use a film forming polymer having a critical surface tension in the substantially dry state that is higher than the critical surface tension of the mandrel surface in combination with a liquid carrier having a sufficiently lower surface tension to form a solution of the film forming polymer, the fluid coating having a surface tension lower than the surface of the mandrel. The normal surface tension measuring unit is dynes/cm. The critical surface tension values of many solid surfaces are well known. For further details as to the determination of the critical surface tension of a surface, reference is made, for example, to the discussion in the Journal of Colloid Science, Vol. 7, 1952 beginning at page 109 and the Journal of Applied Polymer Science, 12, p. 719, 1968. The critical surface tension values of typical polymers based on measurements made between about 20° C. and about 25° C. are poly(1,1-dihydro-perfluorooctyl methacrylate) 10.6 dynes/cm, polyhexafluoropropylene 16.2 dynes/cm, polytetrafluoroethylene 18.5 dynes/cm, polytrifluoroethylene 22 dynes/cm, polyvinylidene fluoride 25 dynes/cm, polyvinyl fluoride 28 dynes/cm, polyvinyl butyral 28 dynes/cm, polyethylene 31 dynes/cm, polytrifluorochloroethylene 31 dynes/cm, polystyrene 33 dynes/cm, polymethyleneoxide 36 dynes/cm, polyvinyl alcohol 37 dynes/cm, polyvinyl formal 38 dynes/cm, polymethylmethacrylate 39 dynes/cm, polyvinyl chloride 39 dynes/cm, polyvinylidene chloride 40 dynes/cm, polycarbonate 42 dynes/cm, polyethylene terephthalate 43 dynes/cm, polyacrylonitrile 44 dynes/cm, polyhexamethlyne adipate 46 dynes/cm. The surface tension values of typical solvents based on measurements made between the temperature specified are isobutyl alcohol 23 dynes/cm at 20° C., ethyl acetate 24 dynes/cm at 20° C., acetone 26 dynes/cm at 0° C., cyclohexane 26 dynes/cm at 20° C., carbon tetrachloride 27 dynes/cm at 20° C., chloroform 27 dynes/cm at 20° C., methylene chloride 27 dynes/cm at 20° C. and 1,1,2 trichlorethane 22 dynes/cm. Reprsentative combinations of film forming polymer, liquid carrier and mandrel surface material are as follows:

| Film Forming Polymer | Liquid Carrier | Mandrel Surface Material |
|---|---|---|
| polycarbonate | methylene chloride + 1,1,2 trichloroethane | polyethylene |
| polycarbonate | methylene chloride + 1,1,2 trichloroethane | polypropylene |
| polycarbonate | 1,1,2 trichloroethane | polyvinylidene fluoride |
| polysulfone | 1,1,2 trichloroethane | polyvinylidene fluoride |
| polysulfone | methylene chloride + 1,1,2 trichloroethane | polyvinylidene fluoride |
| polysulfone | 1,1,2 trichloroethane | polytetrafluoroethylene |
| polyester | methylene chloride + 1,1,2 trichloroethane | polyvinylidene fluoride |

Any suitable liquid film forming polymer that exhibits low critical surface tension characteristics may be employed as a fluid coating on mandrel surfaces without the aid of a surface tension reducing liquid carrier. For example, oligomers having low critical surface tension characteristics may be applied as a uniform coating on a mandrel having a higher critical surface tension than the oligomer and, after deposition, the oligomer may be polymerized to a solid polymer having a higher critical surface tension. A typical oligomer is an aliphatic urethane acrylate (Photomer 6008, available from Diamond Shamrock) which is curable in situ with ultraviolet radiation. For optimum results, the critical surface tension of the mandrel surface should be at least about 5 percent greater than the surface tension of the fluid coating composition for improved wetting of the mandrel surface by the fluid coating and the critical surface tension of the solid coating should be at least about 10 percent greater than the critical surface tension of the mandrel surface for optimum release of the solid coating from the mandrel surface. Although some mandrel surfaces made of a pure material such as polytetrafluoroethylene have a very low surface tension that cannot be coated by some fluid coating compositions, high surface tension material can be admixed with polytetrafluoroethylene to form mandrels which exhibit an overall surface tension greater than the surface tension of the fluid coating composition being applied thereby permitting a uniform coating to be formed on the mandrel.

The first coating on the mandrel which forms the entire belt or a substrate layer (i.e. first layer) of the belt may be opaque or substantially transparent and may comprise any other suitable components in addition to the film forming polymer. Thus, for example, the substrate or first coating may comprise a layer of an electrically nonconductive or conductive material. If the conductive substrate coating contains a nonconductive component, it also contains sufficient conductive material which renders the layer conductive. Any suitable conductive material may be used. For example, the conductive material may include metal flakes, powders or fibers in a binder resin including metal oxides, sulfides, silicides, quaternary ammonium salt compositions, conductive polymers such as polyacetylene or their pyrolysis and molecular doped products, charge transfer complexes, polyphenylsilane and molecular doped products from polyphenylsilane. Typical insulating non-conducting materials include film forming polymers such as polyesters, polycarbonates, polyamides, polyurethanes, and the like. The insulating or conductive substrate should be thin and flexible. An insulating substrate comprising amorphous polymers such as polycarbonate polymers from diphenyl-1,1-cyclohexane and phosgene having a molecular weight of from about 25,000 to about 60,000 are particularly preferred because the resulting substrate is mechanically strong and resists crazing and cracking when exposed to solvents employed in subsequently applied coatings during the fabrication of electrostatographic imaging members. The thickness of the flexible substrate layer depends on numerous factors, including economical considerations and whether the substrate layer constitutes the only layer in the final belt. Thus this layer may be of substantial thickness, for example, as thick as about 500 micrometers, or as thin as about 15 micrometers. When the belt is used in an electrostatographic imaging member, the thickness of the substrate layer should be selected to avoid any adverse affects on the final device. Substrates that are too thin can split and exhibit poor durability characteristics. When the substrate is excessively thick, early failure during cycling and higher cost for unnecessary material are often observed. The substrate layer may comprise a conductive layer or an insulating layer. If the substrate layer is insulating and is intended to be employed in an electrostatographic imaging member, it is normally coated with one or more additional layers such as a conductive layer.

Preferably, the film forming polymer material is deposited in fluid form (e.g. a solution, dispersion or emulsion) on a mandrel having a larger mass, lower thermal conductivity, or larger mass and lower thermal conductivity than the film forming polymer material and solidified at a temperature generally below the apparent $T_g$ of the solidified coating. The coating mandrel is then preferably heated to a temperature above the apparent $T_g$ of the solidified coating to expand the coating and the mandrel while maintaining contact between the coating and mandrel and thereafter cooling the coating to a temperature below the apparent $T_g$ of the solidified coating prior to substantial cooling of the mandrel. Upon further cooling of the mandrel, the mandrel contracts at a greater rate than the solid coating to cause separation between the mandrel and the coating. The coating is thereafter easily removed from the mandrel. The procedure of depositing the film forming polymer material in fluid form (e.g. a solution, dispersion or emulsion) on a mandrel having a larger mass, lower thermal conductivity, or larger mass and lower thermal conductivity than the film forming polymer material and solidified at a temperature generally below the apparent $T_g$ of the solidified coating is also preferred for all subsequently applied layers, particularly when the applied layer will underlie a subsequently applied layer because temperatures above the apparent $T_g$ of the underlying coating may cause the underlying layer to prematurely separate from the mandrel, absorb unwanted solvent from the subsequently applied layer, and cause the final belt to be non-uniform in shape and thickness. However, the last coating may be heated above the apparent $T_g$ of the solidified coating. The glass transition temperature ($T_g$), of a polymer is defined as the temperature range in which a noncrystalline polymer changes from a glassy solid to a rubbery liquid. Since the solidified coating comprises a mixture of film forming polymer (a major component), residual solvent and, in some instances, additives, the $T_g$ of the solidified coating is actually less than the value of the $T_g$ of the polymer itself and is therefore defined herein as the apparent $T_g$. The $T_g$ values of polymers are well known and readily available in the technical literature. Apparent $T_g$ values may be determined by various well known techniques such as by different scanning calorimetry (DSC). In this invention, it is intended that the step of heating a coating to a temperature above the apparent $T_g$ of a solid coating to mean heating the coating to a temperature that can be below the $T_g$ of a puresample of the film forming polymer in the solid coating.

Conductive layers are particularly desirable for the ground plane of electrostatographic imaging members. As indicated hereinabove and hereinbelow, electrically conductive material may be incorporated into the initially applid coating or may be applied in a subsequent layer. More specifically, the conductive layer may comprise a film forming binder containing dispersed conductive particles. Thus, if desired, the seamless substrate itself may be rendered electrically conductive by the incorporation of conductive particles in a binder material at a sufficient loading to provide the electrical conductivity desired. A typical conductive particle loading is from 10 percent to about 35 percent by weight based on the total weight of the layer. Typical conductive particles include carbon black, metal powders, ionic organic conductive particles, conductive inorganic particles, SnO$_2$ doped with antimony or indium, conductive zinc oxide, and the like. The conductive layer composition is preferably a sprayable composition including, for example, finely divided aluminum, titanium, nickel, chromium, brass, gold, stainless steel, carbon black, graphite and the like dispersed in a film forming polymer binder such as the polymers employed in the nonconductive layer described hereinabove and hereinbelow.

The conductive layer may vary in thickness over substantially wide ranges depending on the desired use of the final belt. Satisfactory thicknesses for the conductive layer generally range from about 1 micrometer to about 20 micrometers when the conductive layer is applied to a supporting substrate. When a flexible electrostatographic imaging device is desired, the thickness of the conductive layer may be as thick as about 0.1 micrometer or as thin as about 5 micrometers. A conductive layer that is too thick tends to waste material and adversely affect belt flexibility and a conductive layer that is unduly thin may not be uniformly conductive.

When the belt of this invention is intended to be employed in an electrostatographic imaging member, other layers may be applied to the electrically conductive layer prior to or after removal of the belt from the mandrel. The layers applied to the electrically conductive layer may comprise a blocking layer, an adhesive layer, a photoconductive layer or a combination of these layers with or without additional layers.

Any suitable blocking layer or layers may be applied as one of the belt coatings of this invention. Typical blocking layers include gelatin (e.g. Gelatin 225, available from Knox Gelatine Inc.), and Carboset 515 (B. F. Goodrich Chemical Co.) dissolved in water and methanol, polyvinyl alcohol, polyamides, gamma-aminopropyl triethoxysilane, and the like. Blocking layers generally range in thickness of from about 0.01 micrometer to about 2 micrometers, and preferably have a thickness of from about 0.1 micrometer to about 1 micrometer. Thicknesses outside these ranges may be selected provided the objectives of the present invention are achieved. The blocking layer may be applied with any suitable liquid carrier. Typical liquid carriers include water, methanol, isopropyl alcohol, ketones, esters, hydrocarbons, and the like.

Any suitable adhesive layer may be applied as one of the belt coatings of this invention. Typical adhesive layers include polyesters (e.g. du Pont 49,000, available from E. I. du Pont de Nemours & Co.), 2-vinylpyridene, 4-vinylpyridine and the like. Adhesive layers generally range in thickness of from about 0.05 micrometer to about 2 micrometers, and preferably have a thickness of from about 0.1 micrometer to about 1 micrometer. Thicknesses outside these ranges may be selected provided the objectives of the present invention are achieved. The adhesive layer may be applied with a suitable liquid carrier. Typical liquid carriers include methylene chloride, methanol, isopropyl alcohol, ketones, esters, hydrocarbons and the like.

Any suitable photoconductive layer or layers may be applied as one of the belt coatings of this invention. The photoconductive layer or layers may contain inorganic or organic photoconductive materials. Typical inorganic photoconductive materials include well known materials such as amorphous selenium, selenium alloys, halogen-doped selenium alloys such as selenium-tellurium, selenium-tellurium-arsenic, selenium-arsenic, and the like, cadmium sulfoselenide, cadmium selenide, cadmium sulfide, zinc oxide, titanium dioxide and the like. Inorganic photoconductive materials are normally dispersed in a film forming polymer binder. Typical organic photoconductors include phthalocyanines, quinacridones, pyrazolones, polyvinylcarbazole-2,4,7-trinitrofluorenone, anthracene and the like. Many organic photoconductor materials may also be used as particles dispersed in a resin binder.

Any suitable multilayer photoconductors may also be employed the belt of this invention. The multilayer photoconductors comprise at least two electrically operative layers, a photogenerating or charge generating layer and a charge transport layer. The charge generating layer and charge transport layer as well as the other layers may be applied in any suitable order to produce either positive or negative charging photoreceptors. For example, the charge generating layer may be applied prior to the charge transport layer as illustrated in U.S. Pat. No. 4,265,990 or the charge transport layer may be applied prior to the charge generating layer as illustrated in U.S. Pat. No. 4,346,158, the entire disclosures of these patents being incorporated herein by reference.

The photogenerating layer may comprise a single or multiple layers comprising inorganic or organic compositions and the like. One example of a generator layer is described in U.S. Pat. No. 3,121,006 wherein finely divided particles of a photoconductive inorganic compound are dispersed in an electrically insulating organic resin binder. Useful binder materials disclosed therein include those which are incapable of transporting for any significant distance injected charge carriers generated by the photoconductive particles. Thus, the photoconductive particles must be in substantially contiguous particle to particle contact throughout the layer for the purpose of permitting charge dissipation required for cyclic operation. Thus, about 50 percent by volume of photoconductive particles is usually necessary in order to obtain sufficient photoconductive particle to particle contact for rapid discharge.

Examples of photogenerating layers inclue trigonal selenium, various phthalocyanine pigments such as the X-form of metal free phthalocyanine described in U.S. Pat. No. 3,357,989, metal phthalocyanines such as copper phthalocyanine, quinacridones available from Du-Pont under the tradename Monastral Red, Monastral violet and Monastral Red Y, substituted 2,4-diaminotriazines disclosed in U.S. Pat. No. 3,442,781, polynuclear aromatic quinones available from Allied Chemical Corporation under the tradename Indofast Double Scarlet, Indofast Violet Lake B, Indofast Brilliant Scarlet Indofast Orange. Examples of photosensitive members having at least two electrically operative layers include the charge generator layer and diamine containing transport layer members disclosed in U.S. Pat. No. 4,265,990, U.S. Pat. No. 4,233,384, U.S. Pat. No. 4,306,008, and U.S. Pat. No. 4,299,897; dyestuff generator layer and oxadiazole, pyrazolone, imidazole, bromopyrene, nitrofluorene and nitronaphthalimide derivative containing charge transport layers members disclosed in U.S. Pat. No. 3,895,944; generator layer and hydrazone containing charge transport layers members disclosed in U.S. Pat. No. 4,150,987; generator layer and tri-aryl pyrazoline compound containing charge transport layer members disclosed in U.S. Pat. No. 3,837,851; and the like. The disclosures of these patents are incorporated herein in their entirety.

Photogenerating layers containing photoconductive compositions and/or pigments and the resinous binder material generally ranges in thickness of from about 0.1 micrometer to about 5.0 micrometers, and preferably have a thickness of from about 0.3 micrometer to about 1 micrometer. Thicknesses outside these ranges may be selected provided the objectives of the present invention are achieved. The photogenerating composition or pigment may present in the film forming polymer binder compositions in various amounts. For example, from about 10 percent by volume to about 60 percent by volume of the photogenerating pigment may be dispersed in about 40 percent by volume to about 90 percent by volume of the film forming polymer binder composition, and preferably from about 20 percent by volume to about 30 percent by volume of the photogenerating pigment may be dispersed in about 70 percent by volume to about 80 percent by volume of the film forming polymer binder composition. The particle size of the photoconductive compositions and/or pigments should be less than the thickness of the deposited solidified layer and, more preferably between about 0.01 micrometer and about 0.5 micrometer to facilitate better coating uniformity.

Any suitable transport layer may be applied as one of the belt coatings of this invention to form a multilayered photoconductor. The transport layer may contain a film forming polymer binder and a charge transport material. A preferred multilayered photoconductor comprises a charge generation layer comprising a layer of photoconductive material and a contiguous charge transport layer of a polycarbonate resin material having a molecular weight of from about 20,000 to about 120,000 having dispersed therein from about 25 to about 75 percent by weight of one or more compounds having the general formula:

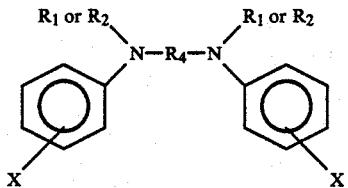

wherein $R_1$ and $R_2$ are an aromatic group selected from the group consisting of a substituted or unsubstituted phenyl group, naphthyl group, and polyphenyl group, $R_4$ is selected from the group consisting of a substituted or unsubstituted biphenyl group, diphenyl ether group, alkyl group having from 1 to 18 carbon atoms, and cycloaliphatic group having from 3 to 12 carbon atoms and X is selected from the group consisting of an alkyl group having from 1 to about 4 carbon atoms and chlorine, the photoconductive layer exhibiting the capability of photogeneration of holes and injection of the holes and the charge transport layer being substantially non-absorbing in the spectral region at which the photoconductive layer generates and injects photogenerated holes but being capable of supporting the injection of photogenerated holes from the photoconductive layer and transporting the holes through the charge transport layer. Examples of charge transporting aromatic amines including those represented by the structural formula above and others for charge transport layers capable of supporting the injection of photogenerated holes of a charge generating layer and transporting the holes through the charge transport layer include N,N'-bis(alkylphenyl)-[1,1'-biphenyl]-4,4'-diamine wherein the alkyl is, for example, methyl, ethyl, propyl, n-butyl, etc., N,N'-diphenyl-N,N'-bis(chlorophenyl)-[1,1'-biphenyl]-4,4'-diamine, N,N'-diphenyl-N,N'-bis(3''-methylphenyl)-(1,1'-biphenyl)-4,4'-diamine, and the like dispersed in an inactive resin binder. Examples of some of these transport materials are described, for example, in U.S. Pat. No. 4,265,990 to Stolka et al, the entire disclosure thereof being incorporated herein by reference. Other examples of charge transport layers capable of supporting the injection of photogenerated holes of a charge generating layer and transporting the holes through the charge transport layer include triphenylmethane, bis(4-diethylamine-2-methylphenyl)-phenylmethane; 4'-4''-bis(diethylamino)-2',2''-dimethyltriphenyl methane and the like dispersed in an inactive resin binder. Numerous inactive resin materials may be employed in the charge transport layer including those described, for example, in U.S. Pat. No. 3,121,006, the entire disclosure of which is incorporated herein by reference. The resinous binder for the charge transport layer may be identical to the resinous binder material employed in the charge generating layer. Typical organic resinous binders include thermoplastic and thermosetting resins such as polycarbonates, polyesters, polyamides, polyurethanes, polystyrenes, polyaryleth-ers, polyarylsulfones, polybutadienes, polysulfones, polyethersulfones, polyethylenes, polypropylenes, polyimides, polymethylpentenes, polyphenylene sulfides, polyvinyl acetate, polysiloxanes, polyacrylates, polyvinyl acetals, polyamides, polyimides, amino resins, phenylene oxide resins, terephthalic acid resins, epoxy resins, phenolic resins, polystyrene and acrylonitrile copolymers, polyvinylchloride, vinylchloride and vinyl acetate copolymers, acrylate copolymers, alkyd resins, cellulosic film formers, poly(amideimide), styrene-butadiene copolymers, vinylidenechloride-vinylchloride copolymers, vinylacetate-vinylidenechloride copolymers, styrene-alkyd resins, and the like. These polymers may be block, random or alternating copolymers.

Generally, the thickness of the solidified transport layer is between about 5 to about 100 microns, but thicknesses outside this range can also be used. The charge transport layer should be an insulator to the extent that the electrostatic charge placed on the charge transport layer is not conducted in the absence of illumination at a rate sufficient to prevent formation and retention of an electrostatic latent image thereon. In general, the ratio of the thickness of the solidified charge transport layer to the charge generator layer is preferably maintained from about 2:1 to 200:1 and in some instances as great as 400:1.

If desired, the photoreceptor may also include an overcoating. Any suitable overcoating may be utilized in the fabrication of the photoreceptor of this invention. Typical overcoatings include silicone overcoatings described, for example, in U.S. Pat. No. 4,565,760, polyamide overcoatings (e.g. Elvamide, available from E. I. du Pont de Nemours & Co.), tin oxide particles dispersed in a binder described, for example, in U.S. Pat. No. 4,426,435, metallocene compounds in a binder described, for example, in U.S. Pat. No. 4,315,980, antimony-tin particles in a binder, charge transport molecules in a continuous binder phase with charge injection particles described in U.S. Pat. No. 4,515,882, polyurethane overcoatings, and the like. The disclosures of U.S. Pat. No. 4,565,760, U.S. Pat. No. 4,426,435, U.S. Pat. No. 4,315,980, and U.S. Pat. No. 4,515,882 being incorporated herein by reference in their entirety. The choice of overcoating materials would depend upon the specific photoreceptor prepared and the protective quality and electrical performance desired. Generally, any overcoatings applied have a thickness between about 0.5 micrometer and about 10 micrometers.

Any suitable material may be used in the mandrel. However, the surface of the mandrel to be coated must be wettable by the material applied. The mandrel should be dimensionally and thermally stable at the processing temperatures utilized. It also should be insoluble in any liquid carrier employed in the coating materials and should not react chemically with the coating material or other components thereof. The mandrel may be uncoated or, if desired, be coated with a suitable release coating prior to applying coatings that are used to form the ultimate seamless belt. It is important that the mandrel be wetted by the applied coating material to achieve uniform leveling which in turn affects the uniformity of the thickness of the applied coating. Typical mandrel materials include metals such as aluminum, stainless steel, nickel, chromium, copper, brass, and the like. Typical polymeric mandrel materials include polyethylene, polypropylene, polymethylpentene, copolymers thereof, and the like. Typical ceramic mandrel materials include ceramic, glass, clay and the like. The mandrel may be formed by extrusion, molding, injection molding, casting and the like to achieve the desired shape. For best release, the mandrel surface preferably has a critical surface tension of less than about 31 dynes/cm. Mandrels having an outer surface of polyethylene, polypropylene, polymethylpentene or copolymers thereof are particularly preferred because they are wetted with applied coating material, facilitate uniform leveling of the coating and contribute to release of the completed layered structure after the structure is heated and cooled. A mandrel entirely composed of polyethylene is an example of a reusable polymeric release material which can be employed as a self supporting mandrel. Although less desirable, the mandrel may be disposable and may, for example, be destroyed during removal of the deposited belt. If the mandrel is to be destroyed, it should be accomplished without adversely affecting the belt such as by using a liquid that dissolves or chemically reacts with the mandrel but not with the belt.

When the mandrel is be coated with a suitable release coating prior to applying coatings that are used to form the ultimate seamless belt, the surface tension relationship between the surface of the mandrel and the applied coating should be selected so that the deposited coating material initially wets the release coating surface and is subsequently removable from the mandrel surface after the final coating is dried. Generally, the release material may be selected from one of three specific types. These three types are reusable polymeric materials, either self-supporting or coated on a suitable substrate, a liquid or dispersion which is applied as a coating to a supporting substrate; and a liquid or powder that may be added to the seamless belt material to promote release. Typical release materials include fluorocarbon polymers such as polyvinylidene fluoride (e.g. Kynar 7201, Kynar 301F, Kynar 202 and Kynar 301F, available from Pennwalt Co.), polytetrafluoroethylene (e.g. Teflon, available from E. I. du Pont de Nemours & Co.), filled polytetrafluoroethylene (e.g. Teflon S, available from E. I. du Pont de Nemours & Co.), polyethylene, polypropylene, phenolic resins, polyphenylene sulfide resins, silicones (e.g. Dow Corning 20, available from Dow Corning Corp.), hydrocarbons (e.g. Frekote 44, available from Freekote Corp.), soaps, detergents,, and the like and mixtures thereof. When release coatings are employed, the release coatings are preferably applied to a clean mandrel surface. Conventional industrial procedures such as chemical washing, solvent cleaning and degreasing of the mandrel prior to application of the release coating may be utilized. Depending upon the initial condition of the mandrel surface, it may be desirable ro remove dirt, rust, mill scale, paint, oil and the like. Adhesion of the release coating to the mandrel surface may be improved by grit blasting or by conversion of coatings typically employed on metal substrates such as zinc manganese, ion phosphates, chromates, and the like. Soft metal mandrel surfaces may be hardened to improve wear by employing conventional face hardening techniques such as by applying a glass, ceramic frit, flame sprayed stainless steel, and the like coating.

The mandrel is generally cylindrical in shape and may be hollow or solid. The mandrel surface coated by the film forming polymer functions as a molding surface for either the inner (coating applied to the outer surface of a solid or hollow mandrel) or outer surface (coating applied to the inner surface of a hollow mandrel) of the belt loop formed by the process of this invention.

The coefficient of expansion properties of both the mandrel and the coatings may be utilized to remove the coating from the mandrel. Aluminum, for example, expanded at a rate of $2.55 \times 10^{-3}$ in/in for a 100° C. change in temperature whereas a polyethylene/polypropylene copolymer expanded at a rate of $6.4 \times 10^{-3}$ in/in for a 100° C. change in temperature which is more than 5 times that of aluminum. Best results are achieved when the coefficient of expansion permits at least about 0.0005 inch of parting gap clearance to form between the inner surface of the belt and the mandrel surface after cooling.

Significant factors to be considered in selecting mandrel materials and coating materials to be deposited include triboelectric properties, critical surface tension, mass, thermal conductivity and polar forces (acid/base interaction).

Generally, the surface tension relationship between the surface of the mandrel and the applied coating should be selected so that the coating material initially wets the mandrel surface and yet may thereafter be removed from the mandrel surface after the final coating is dried. Since low surface tension materials wet high critical surface tension substrates, the surface tension of the coating material as it is applied to the mandrel has a lower surface tension than said mandrel due, for example, to the presence of a low surface tension solvent. However, upon drying, the dried deposited coating preferably can have a critical surface tension higher than the critical surface tension of the mandrel. Thus, the thin substantially uniform fluid coating preferably has a surface tension sufficiently lower than the critical surface tension of the mandrel to form a uniform fluid coating on the mandrel and the uniform solid coating has a critical surface tension greater than that of the mandrel when the uniform solid coating is removed from the mandrel. However, when a mandrel is employed having an outer surface with a critical surface tension of less than about 31 dynes/cm, release of the deposited coating may be achieved even if the critical surface tension of the solid coating is less than that of the mandrel surface.

Any of the coating materials comprising film forming polymers may be deposited on the mandrel from solutions, dispersions, emulsions or powders by any suitable technique. However, the deposited coating should form a thin substantially uniform fluid coating on the mandrel prior to solidification of the coating. Typical techniques for depositing coatings include spray coating, dip coating, wire wound rod coating, powder coating, electrostatic spraying, sonic spraying, blade coating, and the like. If the coating is applied by spraying, spraying may be effected with or without the aid of a gas. Spraying may be assisted mechanical and/or electrical aids such as in electrostatic spraying.

A typical spray gun that may be employed in the process of this invention comprises a central fluid nozzle surrounded closely by an annular concentric air nozzle. The fluid is forced out through the fluid nozzle either by the vacuum created by gas flow through the annular concentric nozzle or by pressurizing the fluid container. Primary atomization (dispersion of fluid droplets) takes place at the exit from the fluid nozzle. Secondary atomization (finer dispersion) occurs at the impingement of the annular gas stream with fluid droplet dispersion. Further atomization and shaping of the spray pattern is produced by gas jets at greater distances from the fluid nozzle. The shape of the spray pattern can be varied from circular to elliptical by gas pressure applied through apertures and impinging at an angle to the main droplet stream. A typical spray gun having these features in a Model 21 spray gun available from Binks Company, Franklin Park, Ill.

It is preferred for optimum uniform coating of the cylindrical mandrel, that the mandrel is normally rotated about its axis and the spray gun is traversed in a direction parallel to the mandrel axis. Materials and process parameters are interdependent in a spray coating operation. Some of the process parameters include propellant gas pressure, solution flow rate, secondary gas nozzle pressure, gun to substrate distance, gun traversal speed and mandrel rotation rate. Materials parameters include, for example, solvent mixtures which affect drying characteristics, the concentration of dissolved solids, the composition of the dissolved solids (e.g. monomer, polymer), and the concentration of dispersed solids when dispersions or solutions are utilized. The deposited coating should be uniform, smooth, and free from blemishes such as entrained gas bubbles and the like.

The coating solutions that are applied by spraying were normally prepared by dissolving polymer in a blend of low and high boiling solvents. The low boiling point solvent flashes off rapidly during spraying to form a high viscosity film on the mandrel. The remaining high boiling point solvent allows the sprayed coating to flow and dry slowly to a uniform smooth film; minimizes trapped air from forming bubbles when subsequently heated; and prevents "blushing" due to condensation of water from low boiling solvents evaporating too rapidly. Combinations of low and high boiling point solvents include methylene chloride and 1,1,2-trichloroethane; methylethyl ketone and methylisobutyl ketone; isopropanol and isobutyl alcohol; methanol and water; tetrahydrofurane and toluene; and the like. Satisfactory results may be obtained with a mixture of from about 40 percent to 80 percent by weight low boiling solvent and 20 percent to 60 percent by weight high boiling solvent. A low boiling solvent is defined herein as a solvent having a boiling point less than about 80° C. and a high boiling solvent is defined herein as a solvent having a boiling point of at least about 100° C. It is preferred that the low boiling solvent also have a high evaporation rate, for example, methlene chloride has a low boiling point and a high evaporation rate and 1,1,2-trichlorethane has a high boiling point and a low evaporation rate. Excellent results have been obtained, for example, with a polycarbonate film forming polymer in a solvent containing about 45 percent by weight methylene chloride and about 55 percent by weight 1,1,2-trichloroethane.

The thin substantially uniform fluid coating comprising the film forming polymer material is preferably applied to the cylindrical mandrel at a processing temperature below about 130° C. to avoid exceeding the apparent $T_g$ of the solid coating until after a thin substantially uniform fluid coating of the film forming polymer material forms on the mandrel. When the resulting uniform fluid coating is the only or last coating applied to the mandrel, it may thereafter be heated to a temperature above about 130° C. to evaporate the liquid carrier, form a uniform solid coating, raise the temperature of the coating above the apparent $T_g$ of the solid coating, and expand the mandrel. The coating may then be cooled below 130° C. to lower the temperature of the coating below the apparent $T_g$ of the solid coating to freeze its dimensions prior to substantial thermal contraction of the mandrel. Thermal contraction of the mandrel can be delayed by selecting mandrels that have a large mass and/or high rate of thermal expansion relative to the deposited coating. This promotes the formation of a parting gap between the mandrel and the coating.

By utilizing coating and mandrel material combinations to ensure that the surface tension of the fluid coating is maintained at a level lower than the critical surface tension of the mandrel during formation of the uniform fluid coating and using mandrels having a critical surface tension of less than about 31 dynes/cm, removal of the final uniform solid coating or coatings from the mandrel is greatly facilitated.

The coatings may be applied to either the outside of cylindrical mandrels or to the inside of hollow cylindrical mandrels. For electrophotographic imaging members, the coatings deposited on the inside of hollow cylindrical mandrels will, of course, be applied in reverse order compared to coatings for electrophotographic imaging members deposited on the outside surface of a cylindrical mandrel.

The substrate materials and or subsequently applied coatings may be polymerized in situ after deposition by suitable techniques such as thermal curing to form the final solid film layer.

Generally, when liquid carriers are utilized in the coating layers, drying of each of the underlying layers is desirable prior to application of a subsequent layer. When reusable mandrels are employed, it is preferred that drying of each of the underlying layers be effected at a temperature less than the apparent $T_g$ of any of the solid coatings in any of the underlying layers because drying above the apparent $T_g$ would remove all the solvent and lead to premature release of the coating from the mandrel with cooling prior to formation of all the coatings. This would result in non-uniform, poor quality belts. Generally, the apparent $T_g$ of the solid coating applied to the mandrel is not exceeded when the thin substantially uniform fluid coating is applied to the mandrel at a temperature well below 130° C. and, more preferably, from about room temperature to about 60° C. Some reasons for drying each coating at relatively low temperatures prior to the application of a subsequent coating are to more rapidly remove the liquid carrier to avoid the formation of blisters. Economy is another reason for drying the underlying coatings at a temperature of from about room temperature up to about 60° C. immediately after each deposited layer. As described hereinabove, it is also preferred that the combination of the film forming polymer material and the liquid carrier have a lower critical surface tension than the film forming polymer material substantially free of the liquid carrier. Moreover, the surface tension of the combination of film forming polymer material and the liquid carrier should preferably have a lower surface tension than the critical surface tension of the mandrel to ensure the formation of a thin substantially uniform fluid coating on the mandrel. Similarly, the surface tension of the combination of film forming polymer material and the liquid carrier of subsequently applied coatings should preferably have a lower surface tension than the surface tension of a dried underlying coating to ensure the formation of a thin substantially uniform fluid coating on the underlying coating.

Although heating of all deposited layers to a temperature above the apparent $T_g$ of all the deposited solid coatings followed by cooling of all deposited layers to a temperature below the apparent $T_g$ of all deposited solid coatings to form a parting gap which facilitates release from reusable mandrels is preferred, a separate heating step for the deposited layer is normally unnecessary for any coating materials applied as a hot melt or where the mandrel is destroyed to separate the deposited coating from the mandrel. The preferred parting gap approach, in which all of the film forming polymer layers are heated above their glass transition temperatures after all the layers have been deposited, minimizes subsequent cracking during and after removal of the belt from the mandrel.

For coating materials that are difficult to remove from a mandrel, it is preferred that the coating material be applied to a metal mandrel coated with a release coating, the resulting uniform coating heated to a temperature greater than about 130° C., and the coating then cooled at a greater rate than the mandrel. Introduction of a fluid between the coating and mandrel prior to removing the coating from the mandrel further reduces adhesion between the mandrel and the uniform solid coating. The fluid may comprise one or more jets of air or a liquid introduced at one or both ends of the mandrel between the mandrel surface and the deposited belt. The jets of fluid may be heated or at room temperature. Moreover, the jets of fluid can be injected between the belt and the mandrel surface while the deposited belt material is at a temperature above the apparent $T_g$ of the solid coating layer or layers of the belt. Rapid quenching of the coated mandrel by immersion in a liquid bath can serve the dual purpose of cooling the coating and introducing a fluid between the coating and mandrel prior to removing the coating from the mandrel. Ionized air or moisturized air may also be utilized to promote removal of the belt from the mandrel by neutralizing static charges on the belt. In addition, ultrasonic energy may applied to the mandrel and/or belt to facilitate removal of the belt.

The belt formed on the mandrel may comprise a single layer or a plurality of layers. Additional layers may be applied to the belt following removal of the belt from the mandrel. For electrostatographic imaging belts, the substrate layer or a single layer having the combined functions of separate substrate and ground plane layers can be formed on a cylindrical mandrel with or without application of a blocking layer, photogenerating layer, transport layer, and an overcoating layer prior to separation of the deposited layers from the cylindrical mandrel.

This technique may be employed for fabricating any suitable thin, seamless belt. These belts may be used for any suitable purpose such as transport belts, paper handling belts, vacuum drives, power transmission, optical devices, intermediate image transfer belts, or other applications in which the presence of a seam is detrimental.

Surprisingly, coated belts formed by the techniques of this invention can be removed from a cylindrical mandrel which is encircled by the deposited belt. Moreover, coated belts formed by the techniques of this invention do not exhibit a pronounced curl problem as do many welded belts formed from coated webs. Thus, special coatings to prevent curl such as an anti-curl backing coating may in most cases be eliminated.

The process of this invention is capable of preparing seamless organic photoreceptors comprising a seamless substrate, conductive ground plane and one or more photoconductive layers. The process of this invention may be used to prepare a seamless organic photoreceptor at one station thereby reducing or eliminating handling and cleaning between deposition of various layers. This results in improvements in yield and reduces the cost by minimizing sources of contamination and defects. The process of this invention may be used to prepare a seamless organic photoreceptor at a single station thereby reducing or eliminating handling and cleaning between deposition of various layers. This results in improvements in yield and reduces the cost by minimizing sources of contamination and defects.

The invention will now be described in detail with respect to specific preferred embodiments thereof along with control examples, it being noted that these examples are intended to be illustrative only and are not intended to limit the scope of the present invention. Parts and percentages are by weight unless otherwise indicated. A Binks spray booth Model BF-4 was used in conjunction with a BINKS model 21 automatic spray gun and a type 42753 reciprocator to apply coating compositions to a cylindrical mandrel in the following Examples except that a Model 77 spray gun was used in Example VI. This equipment is available from Binks Company, Franklin Park, Ill. The Model 21 and Model 77 guns were equipped with various fluid nozzles and air atomization nozzles. The coating composition to be sprayed was placed in a pressure pot and about 10 psi air pressure was applied to the pot to force the coating composition through an hose to the spray gun. The spray gun was operated in an automatic mode in conjunction with the motion of the reciprocator. The mandrel to be sprayed was mounted on a turntable in the booth and rotated at a predetermined rate. The spray gun traversed the length of the mandrel and spraying occurred from top to bottom in a vertical direction. The spray cycle was repeated to obtain the desired thickness.

EXAMPLE I

A coating solution was prepared by dissolving a film forming polymer in a solvent. The specific conditions for coating were as follows:
Film forming polymer: 28 grams polycarbonate resin (Makrolon 5705, available from Bayer Chemical Co.)
Solvent: 522 grams methylene chloride and 600 grams 1,1,2 trichloroethane
Relative humidity: 42 percent
Drum surface speed: 72 inches per second
Nozzle to drum distance: 8 inches
Number of gun passes: 15
Fluid Nozzle: 63B
Air Nozzle: 63PE
Needle setting: 1.5
Fluid feed mode: Pressure pot
Ford No. 2 Cup viscosity: 26 seconds
Mandrel: A polyethylene tube having a smooth outer surface, a length of 12 inches, a diameter of 6 inches, and a thickness of about 1/16 inch Surprisingly, the coating solution sprayed onto the surface of the polyethylene bottle wetted the surface and built up a thin uniform film through repeated spray passes. The outer surface of the film was somewhat rough due to the large number of coating passes After attaining the desired thickness and drying in a hot air oven at about 60° C. for about 3 hours and at about 120° C. for 3 hours. The polymeric belt of polycarbonate readily released from the polyethylene mandrel upon cooling to room temperature. This was particularly surprising since the belt surrounded the cylindrical mandrel. The polyethylene mandrel was reusable and was employed as a mandrel for forming additional belts.

EXAMPLE II

The process described in the immediately preceding Example was repeated with the same coating equipment under the following specific conditions:
Film forming polymer: 28 grams polycarbonate resin (Makrolon 5705, available from Bayer Chemical Co.)
Solvent: 522 grams methylene chloride and 600 grams 1,1,2 trichloroethane
Relative humidity: 45 percent
Drum surface speed: 200 revolutions per second
Nozzle to drum distance: 8 inches
Number of gun passes: 20
Fluid Nozzle: 63B
Air Nozzle: 63PE
Needle setting: 1.5
Fluid feed mode: Pressure pot
Ford No. 2 Cup viscosity: 26 seconds
Mandrel: Polyethylene tube having a smooth outer surface and a thickness of about 1/16 inch
Dried belt thickness: 2 mils The coating solution sprayed onto the surface of the polyethylene bottle wetted the surface and formed a thin, uniform film which could be built up by repeated spray passes. After attaining the desired thickness and drying in a hot air oven at about 140° C., the polymeric belt of polycarbonate released from the polyethylene mandrel upon cooling to room temperature. This was particularly surprising since the belt surrounded the cylindrical mandrel. The polyethylene mandrel was not reusable because the drying temperature exceeded the melting temperature of the polyethylene mandrel.

EXAMPLE III

A coating solution was prepared by dissolving a film forming polymer in a solvent. This coating solution was applied to a cylindrical mandrel in an automatic spray fixture manufactured by Binks Company, Franklin Park, Ill. The spray gun employed was a Binks Spray gun Model 21. The specific conditions for coating were as follows:
Film forming polymer: 28 grams polycarbonate resin (Makrolon 5705, available from Bayer Chemical Co.)
Solvent: 522 grams methylene chloride and 600 grams 1,1,2 trichloroethane
Temperature: 67° F.
Relative humidity: 15 percent
Drum surface speed: about 72 in/sec
Nozzle to drum distance: 9 inches
Number of gun passes: 30
Fluid Nozzle: 63B
Air Nozzle: 63PE
Needle setting: 1.5
Fluid feed mode: Pressure pot
Ford No. 2 Cup viscosity: 26 seconds
Mandrel: 3 inch outside diameter × 12 inch length polypropylene tube having a smooth outer surface having a thickness of about 0.040 inch The coating solution sprayed onto the surface of the mandrel wetted the surface and built up a thin uniform film through repeated spray passes. After attaining the desired thickness, drying at ambient temperature overnight, and oven drying at about 130° C. the polymeric belt of polycarbonate resin readily released from the polypropylene mandrel upon cooling to room temperature. As with the polyethylene mandrel, the polypropylene mandrel was wetted by the sprayed film forming polymer solution and spontaneously released from the mandrel upon drying at elevated temperatures and cooling to room temperature. This was particularly surprising since the belt surrounded the cylindrical mandrel.

EXAMPLE IV

The procedures in the immediately preceding example was repeated with identical materials except that the mandrel was an unfilled Teflon tube. The coating solution (surface tension about 26 dynes/cm) sprayed onto the surface of the mandrel (critical surface tension about 18 dynes/cm) would not wet the mandrel surface because the critical surface tension of the coating solution was greater than the critical surface tension of the surface of the mandrel. This demonstrates that the outer surface of a mandrel consisting of a well known release agent does not necessarily form seamless belts.

EXAMPLE V

A release coating solution was prepared by dissolving a film forming polymer in a heated solvent. This coating solution was applied to a cylindrical mandrel in an automatic spray fixture manufactured by Binks Company, Franklin Park, Ill. The spray gun employed was a Binks electrostatic Spray gun Model 21. The specific conditions for coating were as follows:
Film forming polymer: 56 grams polyvinylidene fluoride (Kynar 7201, available from Pennwalt Corporation)
Solvent: 650 grams methylethyl ketone
Spray mix: 270 ml the polymer plus solvent with 90 ml dimethylformamide
Temperature: 70° F.

Relative humidity: 30 percent
Nozzle to drum distance: 9 inches
Number of gun passes: 4
Fluid Nozzle: 63B
Air Nozzle: 63PE
Needle setting: 1.0
Fluid feed mode: Pressure pot
Mandrel substrate: 3.3 inch outside diameter×15.5 inch length aluminum drum having a smooth outer surface and a thickness of about ⅛ inch The release coating solution sprayed onto the surface of the mandrel wetted the surface and built up a thin uniform film through repeated spray passes which upon drying had a thickness of about 4 micrometers. Another identical drum was coated in substantially the same manner with identical materials except that another polyvinylidene fluoride coating (Kynar 301F, available from Pennwalt Corp.) was substituted for the Kynar 7201. Both of these mandrels coated with a release coating were then coated with a belt forming coating solution which was prepared by dissolving a film forming polymer in a solvent. This coating solution was applied to the cylindrical mandrels in an automatic spray fixture manufactured by Binks Company, Franklin Park, Ill. The spray gun employed was a Binks Spray gun Model 21

Film forming polymer: 56 grams polycarbonate resin (Makrolon 5705, available from Bayer Chemical Co.)
Solvent: 0.275 grams Silwet L-7500 surfactant (available from Union Carbide Co.) and 1100 grams of 1,1,2 trichloroethane
Temperature: 70° F.
Relative humidity: 30 percent
Drum surface speed: 300 rpm
Nozzle to drum distance: 9 inches
Number of gun passes: 1
Fluid Nozzle: 63B
Air Nozzle: 63PE
Needle setting: 1.5
Fluid feed mode: Pressure pot The belt forming coating solution sprayed onto the surfaces of the two mandrels wetted the release surface of each drum and built up a thin uniform film. After drying at 135° C. for one hour, the solid polymeric belt of polycarbonate resin coating having a thickness of about 3 mils was initially released from the mandrel by a stream of air from an air gun injected between the polycarbonate coating and the surface of the release coatings and thereafter easily pulled off one end of the mandrel by hand.

EXAMPLE VI

A release coating solution was prepared by dissolving a film forming polymer in a heated solvent. This coating solution was applied to a cylindrical mandrel in an automatic spray fixture manufactured by Binks Company, Franklin Park, Ill. The spray gun employed was a Binks electrostatic Spray gun Model 77 without any voltages applied. The specific conditions for coating were as follows:
Film forming polymer: 56 grams of polyvinylidene fluoride (Kynar 301F, available from Pennwalt Corporation)
Solvent: 650 grams of methethyl ketone (heated to dissolve polyvinylidene fluoride)
Temperature: 70° F.
Relative humidity: 40 percent
Drum surface speed: 300 rpm
Nozzle to drum distance: 9 inches
Number of gun passes: 4
Fluid Nozzle: N63B
Air Nozzle: N63PE
Needle setting:
Fluid feed mode: Pressure pot
Ford No. 2 Cup viscosity:
Mandrel substrate: 3.3 inch diameter×12 inch length thin walled, cylindrical nickel sleeve having a smooth outer surface and a thickness of about 0.003 inch The release coating solution sprayed onto the surface of the mandrel wetted the surface and built up a thin uniform film through repeated spray passes which was dried at about 100° C. for about 10 minutes. An aluminum drum was coated in substantially the same manner with identical materials. Both of these mandrels coated with a release coating were then coated with a belt forming coating solution which was prepared by dissolving a film forming polymer in a solvent. This coating solution was applied to the cylindrical mandrels in an automatic spray fixture manufactured by Binks Company, Franklin Park, Ill. The spray gun employed was a Binks Spray gun Model 77 with a voltage of about 5,000 volts applied. The specific conditions for coating were as follows:
Film forming polymer: 56 grams of polycarbonate resin (Makrolon 5705, available from Bayer Chemical Co.)
Solvent: 1100 grams of 1,1,2 trichloroethane
Temperature: 74° F.
Relative humidity: 30 percent
Drum surface speed: 300 rpm
Nozzle to drum distance: 9 inches
Number of gun passes: 3
Fluid Nozzle: N63B
Air Nozzle: N63PC
Needle setting:
Fluid feed mode: Pressure pot
Ford No. 2 Cup viscosity:

The belt forming coating solution sprayed onto the surfaces of the two mandrels wetted the release surface of each drum and built up a thin slightly rough film, the slight roughness due apparently to rapid evaporation of the solvent at 74° F. After drying in an oven at 60° C. for about 3 hours and about 120° C. for about 3 hours, the solid polymeric belt of polycarbonate resin coating having a thickness of about 6 mils released from the mandrel when an air jet was injected between the coating and mandrel after cooling to room temperature. The release coatings on these mandrels exhibited relatively poor adhesion to the mandrel and therefore were reapplied to achieve good release when the mandrels were reused for fabricating additional belts.

EXAMPLE VII

As noted in the immediately preceding example, mandrels coated with polyvinylidene fluoride (Kynar 301F) release coatings were wetted by polycarbonate coating solutions but were not reusable due, apparently, to poor adhesion of the release coating to mandrels of aluminum or nickel. However, when the metal mandrels were first coated with a base coating of Kynar 204 metal primer, a Kynar 205 intermediate coating and a Kynar 202 top coat (all available from Pennwalt Corporation), the mandrels could be reused for forming seamless polycarbonate resin belts. Kynar 204, Kynar 205, and Kynar 202 are dispersions of polyvinylidene fluoride in dimethylphthalate and diisobutylketone solvents. Aluminum mandrels were coated by spraying the Kynar 204, 205 and 202 coatings using methylisobutylketone as a diluent to lower viscosity for spraying. After coalescing the coatings at a temperature of from about 225° C. to about 250° C. for about 30 minutes, the resulting coatings were insoluble in methylene chloride solvents. The coating thickness of each of the 3 layers was about 3 micrometers after each coating was separately coalesced. Another mandrel was prepared as previously described with polyvinylidene coatings of Kynar 204 and 205. However, instead of applying a coating of Kynar 202, a coating of Kynar 301F was applied as a top coat using methyl ethyl ketone as a solvent. This top coating was cured at a temperature between about 225° C. and about 250° C. for 30 minutes to give a solvent insoluble, durable release coating. Both of these mandrels coated with release coatings were then coated with a belt forming coating solution which was prepared by dissolving a film forming polymer in a solvent. This coating solution was applied to the cylindrical mandrels in an automatic spray fixture manufactured by Binks Company, Franklin Park, Ill. The spray gun employed was a Binks Spray gun Model 21. The specific conditions for coating were as follows:
Film forming polymer: 225 grams of polysulfone resin (P-3500, available from Union Carbide Corp.)
Solvent: 4400 grams of 1,1,2 trichloroethane
Temperature: 73° F.
Relative humidity: 64 percent
Drum surface speed: about 72 in/sec
Nozzle to drum distance: 9 inches
Number of gun passes: 27
Fluid Nozzle: 63B
Air Nozzle: 63PC
Needle setting: 1.75
Fluid feed mode: Pressure pot
Ford No. 2 Cup viscosity:
Mandrel substrate: 3.3 inch diameter×15.5 inch length aluminum cylinder having a smooth outer surface and a thickness of about 0.100 inch The belt forming coating solution sprayed onto the surfaces of the two mandrels wetted the release surface of each drum. Some difficulty was encountered due apparently to the high relative humidity, and a thin uniform film was built up by many spray passes. The polysulfone resin coating was dried at 60° C. for 2 hours and at 135° C. for one hour and cooled to room temperature. The solid polymeric belt of polysulfone resin slid off easily from the mandrel coated with Kynar 301F. An air was necessary to free the solid polymeric belt of polysulfone resin from the mandrel coated with Kynar 202. After application of an air jet, the belt was removed form the mandrel by hand.

EXAMPLE VIII

The mandrel coated with polyvinylidene fluoride (Kynar 301F) release coating described in the immediately preceding example was coated with a belt forming coating solution which was prepared by dissolving a film forming polymer in a solvent. This coating solution was applied to the mandrel in an automatic spray fixture manufactured by Binks Company, Franklin Park, Ill. The spray gun employed was a Binks Spray gun Model 21. The specific conditions for coating were as follows:
Film forming polymer: 112 grams of polysulfone resin (P-3500, available from Union Carbide Corp.)
Solvent: 1100 grams of 1,1,2 trichloroethane
Temperature: 76° F.
Relative humidity: 68 percent
Drum surface speed: about 72 in/sec
Nozzle to drum distance: 9 inches
Number of gun passes: 15
Fluid Nozzle: 63B
Air Nozzle: 63PE
Needle setting: 2.25
Fluid feed mode: Pressure pot The belt forming coating solution sprayed onto the surface of the mandrel wetted the release surface of each drum and built up a thin, smooth uniform film. The polysulfone resin coating was dried at progressively higher temperatures of 40° C., 70° C. and 120° C. for 1 hour each. The solid polymeric belt of polysulfone resin slid off easily from the mandrel after cooling to room temperature.

EXAMPLE IX

An aluminum mandrel coated with a dispersion (Teflon 954-203S) of polytetrafluoroethylene particles in an epoxy binder. This release coating was coated with a belt forming coating solution which was prepared by dissolving a film forming polymer in a solvent. This coating solution was applied to the mandrel in an automatic spray fixture manufactured by Binks Company, Franklin Park, Ill. The spray gun employed was a Binks Spray gun Model 21. The specific conditions for coating were as follows:
Film forming polymer: 225 grams polysulfone resin (P-3500, available from Union Carbide Corp.)
Solvent: 4400 grams of 1,1,2 trichloroethane
Temperature: 74° F.
Relative humidity: 58 percent
Drum surface speed: about 72 in/sec
Nozzle to drum distance: 8 inches
Number of gun passes: 30
Fluid Nozzle: 63B
Air Nozzle: 63PE
Needle setting: 1.75
Fluid feed mode: Pressure pot
Mandrel substrate: 7 and ⅛ inch diameter×12 inch length aluminum cylinder having a smooth outer surface and a thickness of about 0.16 inch The belt forming coating solution sprayed onto the surface of the mandrel wetted the release surface of each drum and built up a thin, uniform film with a few voids. The polysulfone resin coating was heated at progressively higher temperatures of 40° C. for 3 hours, 50° C. for 1 hour and and 60° C. for 16 hours. After cooling to room temperature overnight, air was injected between the 4 mil thick solid polymeric belt of polysulfone resin and Teflon and the belt was easily slid off the mandrel.

EXAMPLE X

An aluminum mandrel was coated with a release coating of polytetrafluoroethylene dispersed in polyphenylene sulifide. The mandrel substrate was about 9.5 inches in diameter, about 15 inches in length and about ⅛ inch thick. A 28 percent by weight solids solution of poly(amide-imide) in N-methyl-2-pyrrolidone (A1830, available from AMOCO Chemical Co.) was diluted with toluene containing 5 percent by weight solids of a complex phosphate ester (GAFAC RA600) to form a 20 weight percent solution. This coating solution was applied to the mandrel in an automatic spray fixture manufactured by Binks Company, Franklin Park, Ill. The spray gun employed was a Binks Spray gun Model 21. The belt forming coating solution sprayed onto the surface of the mandrel wetted the release surface of the drum and built up a thin, uniform film. The poly(amide-imide) resin coating was heated at progressively higher temperatures of room temperature for 3 minutes, 100° C. for 10 minutes, and 200° C. for 20 minute. After cooling to room temperature, the belt was easily slid off the mandrel.

EXAMPLE XI

A nickel sleeve mandrel was coated with a belt forming coating solution which was prepared by dissolving a film forming polymer in a solvent. This coating solution was applied to the cylindrical mandrels in an automatic spray fixture manufactured by Binks Company, Franklin Park, Ill. The spray gun employed was a Binks Spary gun Model 21. The specific conditions for coating were as follows:
Film forming polymer: 56 grams polycarbonate resin (Makrolon 5705, available from Bayer Chemical Co.)
Internal release agent: 0.28 gram of surfactant (Silwet L-7602, available from Union Carbide Co.)
Solvent: 1100 grams of 1,1,2 trichloroethane
Temperature: 74° F.
Relative humidity: 34 percent
Drum surface speed: about 72 in/sec
Nozzle to drum distance: 9 inches
Number of gun passes: 3
Fluid Nozzle: 63C
Air Nozzle: 63PE
Needle setting: 1.5
Fluid feed mode: Pressure pot
Mandrel: 3.3 in outside diameter×10 inch length×2 mil thickness The belt forming coating solution sprayed onto the surface of the mandrel wetted the surface and built up a thin uniform film. After drying at 135° C. for one hour, the solid polymeric belt of polycarbonate resin coating having a thickness of about 9 mils was initially released from the mandrel by a stream of air from an air gun injected between the polycarbonate coating and the surface of the release coatings and thereafter easily slid off one end of the mandrel by hand. This illustrates the use of an internal release agent which is added to the belt coating mixture rather than applied to the mandrel as a separate release coating.

EXAMPLE XII

A coating solution was prepared by dissolving a film forming polymer in a solvent. This coating solution was applied to a cylindrical mandrel in an automatic spray fixture manufactured by Binks Company, Franklin Park, Ill. The spray gun employed was a Binks Spray gun Model 21. The specific conditions for coating were as follows:
Film forming polymer: 56 grams polyether imide resin (Ultem, available from General Electric Co.)
Solvent: 522 grams methylene chloride and 600 grams of 1,1,2 trichloroethane
Temperature: ambient
Relative humidity: 45 percent
Drum surface speed: 74 inches per second
Nozzle to drum distance: 8 inches
Number of gun passes: 15
Fluid Nozzle: 63B
Air Nozzle: 63PE
Needle setting: 1.2
Fluid feed mode: Pressure pot
Ford No. 2 Cup viscosity: 24 seconds
Mandrel: polypropylene tube having a 3 inch outside diameter, a 12 inch length, a thickness of 0.040 inch and a smooth outer surface The coating solution sprayed onto the surface of the mandrel wetted the surface and built up a thin uniform film through repeated spray passes. After attaining the desired thickness and oven drying at 60° C. for 3 hours and at 120° C. for 3 hours, the polymeric belt readily released from the polypropylene mandrel upon cooling to room temperature.

EXAMPLE XIII

A coating mixture was prepared by mixing a solution of film forming polymers with conductive particles. This coating mixture was applied to a cylindrical mandrel coated with a release agent in an automatic spray fixture manufactured by Binks Company, Franklin Park, Ill. The spray gun employed was a Binks Spray gun Model 21. The specific conditions for coating were as follows:
Film forming polymer: 11 grams copolyester resin (PETG Kodar, available from Eastman Kodak Co.) and 45 grams polycarbonate (Makrolon 5705, available from Bayer Chemical Co.)
Conductive particles: 19 grams carbon black (Black Pearls 2000, available from Cabot Corp.)
Solvent: 440 grams methylene chloride and 600 grams of 1,1,2 trichloroethane
Temperature: 74° F.
Relative humidity: 50 percent
Drum surface speed: about 72 in/sec
Nozzle to drum distance: 9 inches
Number of gun passes: 3
Fluid Nozzle: 63C
Air Nozzle: 63PE
Fluid feed mode: Pressure pot
Mandrel: aluminum drum having a release coating of polyvinylidene fluoride (Kynar 301F)

The coating solution sprayed onto the surface of the mandrel wetted the surface and built up a thin uniform film through repeated spray passes. After attaining the desired thickness and drying at 40° C. for 17 hours, at room temperature for one weekend and at 120° C. for 1 hour the polymeric belt was cooled to room temperature. The conductive belt was initially released from the mandrel by a stream of air from an air gun injected between the coating and the surface of the release coating and thereafter slid off one end of the mandrel by hand.

EXAMPLES XIV-XVI

The following apparatus and procedures were employed to prepare the photoreceptors described in Examples XIV through XVI.

A 12 inch diameter seamless polyolefin polypropylene copolymer tube mandrels having a wall thickness of about 1 inch (available from Asahi American through M&T Plastics, Syracuse, N.Y.) were machined to achieve an outside diameter of about 10.5 inch and a length of about 15.6 inch. Based on a coefficient of thermal expansion and a maximum drying temperature of 120° C., the maximum expanded diameter of these mandrels was calculated to be 10.62 inches which was the diameter of the intended seamless photoreceptors to be prepared on the mandrels. The final surface finish was burnished.

The conductive layer dispersions were prepared by dissolving a film forming polymer in a suitable solvent and then placing one half of it into a container half filled with equal amounts of 9 mm and 6 mm glass beads. To this was added carbon black to form a dispersion mixture. The mixture was dispersed on a roll mill for about 64 hours and thereafter diluted with the remaining polymer solution to arrive at the final sprayable formulation. The generator layer solution/dispersion was prepared by ball milling a film forming polymer, photoconductive particles and ¼ inch diameter stainless steel shot. A portion of the resulting slurry was thereafter added to a solution of film forming polymer and solvent. This slurry was then mixed in a shaker. The resulting mixture was diluted with a solvent for spray coating. The blocking and transport layers were prepared by dissolving the appropriate materials in a solvent. After spray coating, each layer was dried at room temperature for about 30 minutes. After deposition of the last layer, the resulting photoreceptor was dried in an oven which was programmed to increase the temperature gradually. The drying temperatures in the oven were 60° C., 90° C., and 120° C. with 0.5 hour allotted to increase the temperature to the next higher temperature level where drying was for 2.5 hours for a total drying time of 9 hours The photoreceptor was removed from the mandrel by cooling the assembly to room temperature while exposed to air or by quenching the assembly in water at room temperature. The quenching step gave release more rapidly and only 3 to 4 minutes was required for release. The mandrel was then removed by merely lifting it from the water while the photoreceptor remained free floating. The final photoreceptors in Examples XIV through XVI were complete and had a minimum of thermal distortion. It is believed that the mandrel expanded to a dimension of about 10.62 inch when it was heated to the maximum drying temperature of about 120° C. which exceeded the apparent $T_g$ of all the solid coatings in the layered member. Upon cooling, the seamless photoreceptor on the outside of the mandrel cooled first below its glass transition temperature while the mandrel remained in its expanded state due the mass of the mandrel which retarded cooling. When the mandrel finally cooled to about ambient temperature, it returned to its original outside diameter of about 10.5 inch whereas the inside diameter of the photoreceptor remained at the expanded inside diameter of about 10.62 inches because it had been cooled to a temperature below the apparent $T_g$ of any of its coating layers prior to any significant contraction of the mandrel. This significant difference in the diameters of the photoreceptor and the mandrel after cooling facilitated separation, particularly in view of the weak bond between the smooth mandrel surface and the inside surface of the photoreceptor belt.

EXAMPLE XIV

A complete photoreceptor was prepared using the procedures described above in the immediately preceding paragraphs. The layers were applied to the mandrel in the sequence that appear below:
Substrate layer:
Film forming polymer: 56 grams of polycarbonate resin reaction product of diphenyl-1,1-cyclohexane and phosgene having a number weight average molecular weight of about 26,000.
Solvent: 660 grams of methylene chloride and 440 grams of 1,1,2trichloroethane
Relative humidity: 50 percent
Temperature: 71° F.
Nozzle to drum distance: 8 inches
Fluid Nozzle: 63B
Fluid pressure: 8
Air Nozzle: 63PE
Atomization pressure: 50
Fan angle: 0.5
Needle setting: 2.25
Fluid feed mode: Pressure pot
Number of gun passes: 13
Drum surface speed: 300 rpm
Dried thickness: 3 mils
Mandrel substrate: polyethylene/polypropylene copolymer ¼ inch thick cylinder having a smooth burnished surface coated with a residual coating (applied prior to previous run) of polysiloxane oil release coating (Dow Corning 20, available from Dow Corning)
Conductive Layer:
Film forming polymer: 80 grams of acrylic resin (Carboset 514 A, available from B. F. Goodrich Chemical Co.) and 0.84 gram of polyfunctional aziridine (XAMA-2, available from Cordova Chemical Co.)
Conductive particles: 9.9 grams carbon black (Black Pearls 2000, available from Cabot Corp.)
Solvent: 660 grams of methylene chloride and 440 grams of 1,1,2 trichloroethane
Relative humidity: 50 percent
Temperature: 71° F.
Nozzle to drum distance: 8 inches
Fluid Nozzle: 63B
Fluid pressure: 4
Air Nozzle: 63PE
Atomization pressure: 50
Fan angle: 0.5
Needle setting: 1.25
Fluid feed mode: Pressure pot
Number of gun passes: 4
Drum surface speed: 300 rpm
Dried thickness: 12 micrometers
Applied to: substrate layer
Blocking Layer:
Film forming polymer: 5.75 grams gelatin (Gelatin 225, available from Knox Gelatin Co.) and 1.25 grams acrylic resin (Carboset 515 available from B. F. Goodrich Chemical Co.)
Solvent: 1.00 ml NH$_4$OH, 300 grams H$_2$O and 200 grams methanol
Relative humidity: 50 percent
Temperature: 71° F.
Nozzle to drum distance: 8 inches
Fluid Nozzle: 63B
Fluid pressure: 4
Air Nozzle: 63PE
Atomization pressure: 45
Fan angle: 0.5
Needle setting: 1.0
Fluid feed mode: Pressure pot
Number of gun passes: 3
Drum surface speed: 300 rpm
Dried thickness: 1 micrometer
Applied to: conductive layer
Adhesive Layer:
Film forming polymer: 1.0 gram of 4-vinyl pyridine
Solvent: 470 grams isopropyl alcohol and 180 grams isobutyl alcohol
Relative humidity: 50 percent
Temperature: 71° F.
Nozzle to drum distance: 8 inches Fluid Nozzle: 63B
Fluid pressure: 4
Air Nozzle: 63PE
Atomization pressure: 50
Fan angle: 0.5
Needle setting: 0.8
Fluid feed mode: Pressure pot
Number of gun passes: 1
Drum surface speed: 300 rpm
Dried thickness: <0.05 micrometer
Applied to: blocking layer
Generator Layer:
Film forming polymer: 100 grams (slurry of polyvinyl carbazole and selenium particles in tetrahydrofuran and toluene)
Solvent: 258 grams toluene and 258 grams tetrahydrofuran
Relative humidity: 50 percent
Temperature: 71° F.
Nozzle to drum distance: 8 inches
Fluid Nozzle: 63B
Fluid pressure: 4
Air Nozzle: 63PE
Atomization pressure: 45
Fan angle: 0.5
Needle setting: 1
Fluid feed mode: Pressure pot
Number of gun passes: 4
Drum surface speed: 300 rpm
Dried thickness: 1 micrometer
Applied to: adhesive layer
Transport Layer
Film forming polymer: 132 grams polycarbonate resin (Merlon M-50-F, available from Mobay Chemical Co.)
Charge transport Material: 88 grams N,N'-diphenyl-N,N'-bis(3-methylphenyl)-1,1'-biphenyl-4,4'-diamine
Solvent: 2640 grams methylene chloride and 1760 grams 1,12-trichloroethane
Relative humidity: 50 percent
Temperature: 71° F.
Nozzle to drum distance: 8 inches
Fluid Nozzle: 63B
Fluid pressure: 8
Air Nozzle: 63PE
Atomization pressure: 45
Fan angle: 0.5
Needle setting: 1.8
Fluid feed mode: Pressure pot
Number of gun passes: 4
Drum surface speed: 300 rpm
Dried thickness: 20 micrometers
Applied to: generator layer

EXAMPLE XV

A complete photoreceptor was prepared using the procedures and with the conditions and materials described in Example XIV except that the substrate below was substituted for the substrate described in Example XIV.
Substrate Layer:
Film forming polymer: 56 grams polycarbonate resin reaction product of diphenyl-1,1-cyclohexane and phosgene having a number weight average molecular weight of about 52,000
Solvent: 660 grams methylene chloride and 440 grams 1,1,2 trichloroethane
Relative humidity: 50 percent
Temperature: 71° F.
Nozzle to drum distance: 8 inches
Fluid Nozzle: 63B
Fluid pressure: 8
Air Nozzle: 63PE
Atomization pressure: 50
Fan angle: 0.5
Needle setting: 2.25
Fluid feed mode: Pressure pot
Number of gun passes: 20
Drum surface speed: 300 rpm
Dried thickness: 3 mils
Mandrel substrate: polyethylene/polypropylene copolymer cylinder having a smooth burnished surface coated with a residual coating (applied prior to previous run) of polysiloxane oil release coating (Dow Corning 20, available from Dow Corning)

EXAMPLE XVI

A complete photoreceptor was prepared using the procedures and with the conditions and materials described in Example XIV except that the substrate below was substituted for the substrate described in Example XIV.
Substrate Layer:
Film forming polymer: 56 grams of polycarbonate resin reaction product of diphenyl-1,1-cyclohexane and phosgene having a number average molecular weight of about 77,000
Solvent: 660 grams of methylene chloride and 440 grams of 1,1,2 trichloroethane
Relative humidity: 53 percent
Temperature: 75° F.
Nozzle to drum distance: 8 inches
Fluid Nozzle: 63B
Fluid pressure: 9
Air Nozzle: 63PE
Atomization pressure: 50
Fan angle: 0.5
Needle setting: 3.5
Fluid feed mode: Pressure pot
Number of gun passes: 19
Drum surface speed: 300 rpm
Dried thickness: 3 mils
Mandrel substrate: polyethylene/polypropylene copolymer cylinder having a smooth burnished surface coated with a residual coating (applied prior to previous run) of polysiloxane oil release coating (Dow Corning 20, available from Dow Corning)

EXAMPLE XVII

A cylindrical polyethylene mandrel having a thickness of about 1/16 inch was spray coated with a solution of 20 grams of polycarbonate resin (Makrolon 5705, available from Bayer Chemical Co.), 522 grams of methylene chloride and 600 grams of 1,1,2-trichloroethane to form a substrate layer. A BINKS Model 21 automatic spray gun with a 63B fluid nozzle and a 63PE air nozzle was used to deposit the substrate coating. The fluid pressure was 9 pounds, air pressure was 45 pounds, fan angle was 1 turn open and the needle setting was 1.5 turns open. The mandrel was mounted on an air driven turntable rotating at about 100 rpm and the traverse rate of the spray gun was about 4 inches per second. The tube rotation and traverse rate was held constant for spray coating of all the layers. The deposited coating was allowed to dry at ambient temperature for about 30 minutes. An electrically cobductive layer was thereafter sprayed onto the substrate coating. The electrically conductive layer coating composition contained 28 grams of polycarbonate resin (Makrolon 5705, available from Bayer Chemical Co.), 15 grams of carbon black (Black Pearls L, available from Cabot Corp.), 522 grams methylene chloride, and 600 grams of 1,1,2-trichloroethane. The carbon black was dispersed in the Makrolon 5705 by roll milling for 45 hours in a 32 oz. size glass bottle half filled with equal amounts of 9 mm and 6 mm glass beads. This dispersion was sprayed onto the seamless substrate layer using the BINKS automatic spray gun with a 63C fluid nozzle and 63PE air nozzle. The fluid pressure was 9 pounds, air pressure was 45 pounds, fan angle was 1 turn open and the needle setting was 1.5. Four coating passes resulted in a dried thickness of about 10 micrometers. This layer was dried at ambient temperature for about 30 minutes. A transport layer of 16.3 grams polycarbonate resin (Makrolon, available from Bayer Chemical Co.), 11.2 grams N,N'-diphenyl-N,N'-bis(3-methylphenyl)-1,1'-biphenyl-4,4'-diamine, 522 grams of methylene chloride and 592 grams 1,1,2-trichloroethane was thereafter sprayed on the conductive layer. The transport layer coating was applied with a BINKS Model 21 spray gun with a 63B fluid nozzle and a 63PE air nozzle. The fluid pressure was 9 pounds, the air pressure was 45 pounds, the fan angle was 1 and the needle setting was 1.2. Fifteen passes provided a transport layer thickness of about 17 micrometers after drying. This transport layer was air dried at ambient temperature. A generator layer was thereafter applied to the transport layer. The generator layer contained 6.42 of a polyester binder (PE-100), 2.75 grams of vanadyl phthalocyanine, 522 grams of methylene chloride and 512 grams of 1,1,2-trichloroethane. This generator layer composition was applied by spraying utilizing a BINKS Model 21 gun with a 63B fluid nozzle, 63PE air nozzle, a fluid pressure of 9 pounds, an air pressure of 45 pounds, a fan angle of 1.0 and a needle setting of 1.0. About 7 passes were employed to provide a thickness after drying of about 1 micrometer. This generator layer was allowed to air dry for at least 1 hour and the entire coated mandrel was thereafter dried in a forced air oven at 120° C. for 1 hour. Upon cooling in ambient air the photoreceptor released from the substrate and was easily removed by hand yielding a belt photoreceptor. The total photoreceptor thickness was about 71.0 micrometers, the substrate thickness was 43.0 micrometers, the conductive layer thickness was about 10.5 micrometers, the transport layer thickness was about 16.9 micrometers and the generator layer thickness was about 0.94 micrometer. This photoreceptor was compared for electrical performance with a photoreceptor containing the same transport and generator layers coated on an aluminum substrate.

EXAMPLE XVIII

A control was prepared in the same manner as the spray coated photoreceptor of Example XVII except that an aluminum plate was substituted for both the polypropylene mandrel and conductive layer of Example XVII. The aluminum plate functions as a permanent support and conductive layer. The results of electrical testing for photo induced discharge characteristics of this control photoreceptor and the photoreceptor of Example XVII are shown in the following table:

| Exposure (microwatts) | Example XVII Photoreceptor (Volts) | Control Photoreceptor (Volts) |
|---|---|---|
| 0 | 860 | 900 |
| 0.5 | 630 | 660 |
| 1 | 530 | 530 |
| 1.75 | 350 | 300 |
| 2.2 | | 200 |
| 3.1 | 290 | |
| 3.6 | 170 | |
| 3.75 | | 85 |
| 4.2 | | 60 |
| 4.8 | 120 | |

This test shows that the photo induced discharge performance of the belt photoreceptor of Example XVII prepared by the process of this invention compares well with that of a photoreceptor formed on a permanent, rigid supporting ground plane.

EXAMPLE XIX

A seamless photoreceptor was prepared utilizing the procedures described in preceding Example XVII except that after applying the generator layer and drying it at ambient temperature, an electrical blocking layer was applied by spraying on to the generator layer surface. The blocking layer contained 4.0 grams of polyvinyl butyral (Butvar B-72, available from Monsanto Chemical Co.), 4.0 grams of zirconium acetyl acetonate, 436 grams of isopropyl alcohol, 34.6 grams of water and 180 grams of isobutyl alcohol. Spray coating was carried out with a BINKS Model 21 automatic spray gun with a 63B fluid nozzle, 63PE air nozzle, a fluid pressure of 9 pounds, an air pressure of 54 pounds, fan angle of 3 turns open, and a needle setting of 0.8 turn open. Three spray coating passes were made. After air drying, a protective overcoating was applied to the blocking layer. The overcoting contained 16.3 grams of polycarbonate resin (Makrolon 5705, available from Bayer Chemical Co.), 11.2 grams of N,N'-diphenyl-N,N'-bis(3-methylphenyl)-1,1'-biphenyl-4,4'-diamine, 0.27 grams of carbon black (Black Pearls L, available from Cabot Corp.), about 0.135 gram dispersant (Silwet L7500, available from Union Carbide Co.), about 522 grams methylene chloride, and about 592 grams 1,1,2-trichloroethane. This mixture was applied with a BINKS Model 21 spray gun with a 63B fluid nozzle, 63PE air nozzle, a fluid pressure of 6.5 pounds, air pressure of 65 pounds, fan angle of 1.0, and a needle setting of about 1.5. Three passes were made to form an overcoating thickness of about 6 micrometers. The completed overcoated photoreceptor was allowed to air dry for at least 1 hour and thereafter dried in a forced air oven at 120° C. for 2 hours. Upon cooling, the photoreceptor released from the polypropylene mandrel.

EXAMPLE XX

The procedure as described in Example XVII was repeated except that entire seamless substrate layer was rendered electrically conductive throughout its bulk by incorporating carbon black particles dispersed in a polymer. The composition was applied by spraying a coating containing 28 grams of polycarbonate resin (Makrolon 5705, available from Bayer Chemical Co.), 15 grams of carbon black (Black Pearls L, available from Cabot Corp.), 522 grams methylene chloride, and 600 grams 1,1,2-trichloroethane onto a polyethylene mandrel. A BINKS Model 21 spray gun with a 63C fluid nozzle, 63PE air nozzle, a fluid pressure of 10 pounds, an air pressure of 65 pounds, fan angle of 1 turn open, and a needle setting of about 1.5 turns open was used to apply the electrically conductive substrate to the mandrel. Twenty four passes were made to form a seamless belt substrate having a dried thickness of about 1.5 mils. The completed overcoated photoreceptor was allowed to air dry for at least 1 hour and thereafter dried in a forced air oven at 120° C. for 2 hours. Upon cooling, the photoreceptor released from the mandrel.

Although the invention has been described with reference to specific preferred embodiments, it is not intended to be limited thereto, rather those skilled in the art will recognize that variations and modifications may be made therein which are within the spirit of the present invention and within the scope of the following claims.

What is claimed is:

1. A process for fabricating a thin, flexible, seamless belt comprising forming at least one thin substantially uniform fluid coating comprising film forming polymer material on a cylindrical mandrel having a cylindrical molding surface parallel to the axis of said cylinder, said mandrel having a larger mass, lower thermal conductivity, or larger mass and lower thermal conductivity than said film forming polymer material and a critical surface tension greater than the surface tension of said fluid coating, solidifying said fluid coating to form at least one thin substantially uniform solid coating comprising said film forming polymer material on said cylindrical mandrel, heating both said uniform solid coating and said mandrel to a temperature at least above the apparent $T_g$ of said solid coating to expand said coating and said mandrel while maintaining contact between said coating and said mandrel, cooling said coating to a temperature below the apparent $T_g$ of said solid coating prior to substantial cooling of said mandrel, and cooling said mandrel whereby said mandrel contracts at a greater rate than said solid coating until separation occurs between said mandrel and said solid coating, and removing said solid coating from said mandrel.

2. A process for fabricating a thin, flexible, seamless belt according to claim 1 wherein said thin substantially uniform fluid coating comprises a film forming polymeric binder and a liquid carrier for said film forming polymer binder, and said liquid carrier is removed from said fluid coating prior to removing said coating from said mandrel, the combination of said film forming polymer material and said liquid carrier having a lower surface tension than said film forming polymer material free of said liquid carrier.

3. A process for fabricating a thin, flexible, seamless belt according to claim 1 wherein said thin substantially uniform fluid coating is applied to and solidified on said mandrel at a temperature below about 60° C.

4. A process for fabricating a thin, flexible, seamless belt according to claim 1 wherein said solid coating is cooled by rapid quenching in a cool fluid.

5. A process for fabricating a thin, flexible, seamless belt according to claim 1 comprising rotating said cylindrical mandrel around its axis and forming at least one thin substantially uniform fluid coating comprising said film forming polymer material on the outer surface of said cylindrical mandrel by spraying with a spray gun traversing in a direction parallel to said axis of said mandrel while said cylindrical mandrel is rotated.

6. A process for fabricating a thin, flexible, seamless belt according to claim 1 wherein said mandrel comprises polyethylene, polypropylene, and copolymers thereof.

7. A process for fabricating a thin, flexible, seamless belt comprising forming a first thin substantially uniform fluid coating comprising film forming polymer material on a cylindrical mandrel having a cylindrical molding surface parallel to the axis of said cylinder, said mandrel having a larger mass or lower thermal conductivity than said film forming polymer material and a critical surface tension greater than the surface tension of said fluid coating, solidifying said first fluid coating at a temperature below the apparent $T_g$ of the solidified coating to form a first thin substantially uniform solid coating comprising said film forming polymer material on said cylindrical mandrel, forming at least a second thin substantially uniform fluid coating comprising film forming polymer material on said first thin substantially uniform solid coating, solidifying said second fluid coating to form a second thin substantially uniform solid coating comprising said film forming polymer material on said first coating, heating said first uniform solid coating, said second uniform solid coating and said mandrel to a temperature above the apparent $T_g$ of the first uniform solid coating and said second uniform solid coating to expand said first uniform solid coating, said second uniform solid coating and said mandrel while maintaining contact between said mandrel and said first and second uniform solid coatings, cooling said coatings to a temperature below the apparent $T_g$ of said solid coatings prior to substantial cooling of said mandrel, and cooling said mandrel whereby said mandrel contracts at a greater rate than said solid coatings until separation occurs between said mandrel and said solid coatings, and removing said solid coatings from said mandrel.

8. A process for fabricating a thin, flexible, seamless belt according to claim 7 including repeating said coating forming and solidifying steps to form at least an electrically conductive coating, a charge generator coating and a charge transport coating prior to removing said coatings from said mandrel.

9. A process for fabricating a thin, flexible, seamless belt comprising forming at least one thin substantially uniform fluid coating comprising a film forming polymer and at least one solvent for said film forming binder around a cylindrical mandrel at a temperature below about 60° C., said thin substantially uniform fluid coating having a surface tension sufficiently less than the critical surface tension of said mandrel to form said uniform fluid coating on said mandrel, said mandrel having a cylindrical molding surface parallel to the axis of said cylinder, solidifying said fluid coating at a temperature below about 60° C. to form a uniform solid coating around said cylindrical mandrel, heating said mandrel and said uniform solid coating to a temperature above about 130° C. and above the apparent $T_g$ of said uniform solid coating, and cooling said uniform solid coating below about 130° C. and below the apparent $T_g$ of said uniform solid coating prior to substantial cooling of said mandrel, cooling said mandrel whereby said mandrel contracts at a greater rate than said uniform solid coating, and removing said uniform solid coating as a thin, flexible, seamless belt from said mandrel, said uniform solid coating being substantially dry and having a critical surface tension greater than the critical surface tension of said mandrel when said uniform solid coating is removed from said mandrel.

10. A process for fabricating a thin, flexible, seamless belt according to claim 9 wherein said thin substantially uniform fluid coating comprises at a mixture of solvents for said film forming binder, said mixture comprising from about 40 percent to about 80 percent by weight of a low boiling solvent and from about 20 percent to about 60 about percent by weight of a high boiling solvent.

11. A process for fabricating a thin, flexible, seamless belt according to claim 9 wherein said critical surface tension of said mandrel is at least about 5 percent greater than the surface tension of said thin substantially uniform fluid coating and said uniform solid coating has a critical surface tension of at least about 10 percent greater than said critical surface tension of said mandrel.

12. A process for fabricating a thin, flexible, seamless belt according to claim 9 wherein said thin substantially uniform fluid coating comprises a film forming polymer and a release agent.

13. A process for fabricating a thin, flexible, seamless belt according to claim 9 including reducing adhesion between said mandrel and said uniform solid coating prior to removing said uniform solid coating from said mandrel.

14. A process for fabricating a thin, flexible, seamless belt according to claim 13 comprising introducing a fluid between said coating and said mandrel thereby reducing adhesion between said mandrel and said uniform solid coating prior to removing said uniform solid coating from said mandrel.

15. A process for fabricating a thin, flexible, seamless belt according to claim 9 wherein said said mandrel comprises a core having an outer surface coated with a release coating.

16. A process for fabricating a thin, flexible, seamless belt according to claim 9 wherein said thin, flexible, seamless belt has a thickness between about 15 micrometers and about 500 micrometers.

17. A process for fabricating a thin, flexible, a seamless belt according to claim 9 wherein said cylindrical mandrel is a hollow sleeve and said cylindrical molding surface is the inside surface of said hollow sleeve.

* * * * *